(12) United States Patent
Yamada

(10) Patent No.: US 7,318,316 B2
(45) Date of Patent: Jan. 15, 2008

(54) REHEAT/REGENERATIVE TYPE THERMAL POWER PLANT USING RANKINE CYCLE

(76) Inventor: Katsushige Yamada, 17-7, Yobitsugimotomachi, Minami-ku, Nagoya-shi, Aichi 457-0011 (JP)

( * ) Notice: Subject to any disclaimer, the term of this patent is extended or adjusted under 35 U.S.C. 154(b) by 43 days.

(21) Appl. No.: 10/558,397

(22) PCT Filed: Jul. 2, 2004

(86) PCT No.: PCT/JP2004/009863

§ 371 (c)(1),
(2), (4) Date: Jul. 17, 2006

(87) PCT Pub. No.: WO2005/003628

PCT Pub. Date: Jan. 13, 2005

(65) Prior Publication Data

US 2006/0254251 A1    Nov. 16, 2006

(30) Foreign Application Priority Data

Jul. 4, 2003    (JP) .............................. 2003-290885

(51) Int. Cl.
*F01K 7/34* (2006.01)
(52) U.S. Cl. .......................................... 60/653; 60/679

(58) Field of Classification Search ............... 60/653, 60/679
See application file for complete search history.

(56) References Cited

U.S. PATENT DOCUMENTS 5,485,728 A * 1/1996 Dickinson .................... 60/648
6,035,642 A * 3/2000 Peletz et al. ................. 60/649
6,282,902 B1 * 9/2001 Okusawa et al. ............ 60/653

FOREIGN PATENT DOCUMENTS

JP         8-193505 A      7/1996

* cited by examiner

*Primary Examiner*—Hoang Nguyen
(74) *Attorney, Agent, or Firm*—Morgan, Lewis & Bockius LLP

(57) ABSTRACT

A reheat-and-regenerating type thermal power plant (A) using Rankine cycle has a water feed bypass (BW) which supplies high temperature fluid (28) produced in a large incineration plant (27) to a heat exchanger (29) and by which confluent feed water (Wg) resulting from the confluence of separated condensed-water (32), separated low temperature feed water (33), separated medium temperature feed water (34) and separated high temperature feed water (35) is supplied to a superheat conduction pipe (3a) through a heat exchanger conduction pipe (29a). The water feed bypass (BW) is installed separately from a feed water path (W), thus insuring an efficient use of the high temperature fluid (28) produced upon incinerating a huge amount of combustible wastes in the large incineration plant (27).

5 Claims, 3 Drawing Sheets

REHEAT/REGENERATIVE TYPE THERMAL POWER PLANT USING RANKINE CYCLE

FIELD OF THE INVENTION

The invention relates to a reheating-and-regenerating type thermal power plant using Rankine cycle to make better use of a high temperature fluid (e.g., hot water and steam) produced when a large quantity of combustible wastes are incinerated at a large incineration plant.

BACKGROUND OF THE INVENTION

Working steam produced upon incinerating the combustible wastes is mainly employed to a thermal power plant installed in an incineration plant. The thermal power plant, however, comes to a small-scaled facility which reduces a thermic efficiency gained upon converting a heat generation to an electricity. This makes it difficult to produce a thermal power plant to such a degree as applicable to a commercial and business usage.

For the thermal power plant installed in the incineration plant to generate the electricity due to the steam produced when the combustible wastes are incinerated, it is difficult to efficiently use the heat energy produced by the steam.

In the usual incineration plant, the quantity of the combustible wastes to be incinerated is regulated only to produce a comparably small quantity of the heat generation. In addition, the combustible wastes fluctuate in its quality and quantity on the daily basis, and the incineration plant is usually such treated as to suppress an emission of dioxin (polychlorinatd dibenzo-para-dioxin). For the fear that a incinerator furnace of the incineration plant would be damaged when inappropriate chemical products such as vinyl and plastic materials are thrown, it comes necessary to tentatively stop the operation upon checking or repairing the incineration plant.

Among the recently built thermal power plants employed for the commercial and business usage, there has been one in which a reheating-and-regenerating type Rankine cycle is utilized with super-critically high pressure, or a thermal power plant using a combined cycle in which the Rankine cycle is incorporated into a turbine. The thermic efficiency gained upon converting a thermal energy into an electricity in the former plant goes as high as approx. 42%, and the similar efficiency gained in the latter plant reaches 48%.

The thermic efficiency of the thermal power plant installed in the ordinary incineration plant is as low as approx. 10% on average, i.e., less than one-fourth of the above thermal power stations.

With this im mind, techniques have been sought out to make better use of a large quantity of the thermal energy of the steam and hot water generated when burning the combustible wastes in the incineration plant.

By way of illustration, FIG. 3 shows the thermal power plant with the super-critically high pressure in which the Rankine cycle is incorporated into the ordinary thermal power plant for commercial and business usage. This is based on a technological book (on page 44 of "Performance and Economy of Steam Turbine" written by Robert L. Bartlet and translated into Japanese by Eiichi Ishibashi and Yusaku Shibata, and published in 1965 by Ohm Corporation).

In the thermal power plant with the super-critically high pressure shown in FIG. 3, numeral 1 a super-critically high pressure boiler, 2 a steam-water mixed fluid, 3 a superheater, 4 a main steam, 5 a high pressure turbine, 6 a high pressure exhaust, 7 a reheater, 8 a reheating steam, 9 a medium pressure turbine, 10 a low pressure turbine, 11 an electric generator, 12 a low pressure exhaust, 13 a condenser unit, 14 a condensed water, 15 a condensed-water pump, 16 a low pressure feed water heater, 17 a low pressure bleed, 18-1 a low temperature feed water, 18-2 a medium temperature feed water, 18-3 a high temperature feed water, 19 a feed water pump, 20 a medium pressure feed water heater, 21 a medium pressure bleed, 22 a high pressure feed water heater, 23 a high pressure bleed, 24 a boiler feed water, 25 a drain water and 26 a drain pump.

The low pressure exhaust 12 released from the low pressure turbine 10 forms the condensed water 14 at the condenser unit 13 to transfer the condensed water 14 to the low pressure feed water heater 16 by means of the condensed-water pump 15, and heated by the low pressure bleed 17 extracted from the low pressure turbine 10 to result in the low temperature feed water 18-1 within the low pressure feed water heater 16.

The low temperature feed water 18-1 is transferred to the medium pressure feed water heater 20 by means of the feed water pump 19, and heated by the medium pressure bleed 21 extracted from the medium pressure turbine 9 to result in the medium temperature feed water 18-2 within the medium pressure water heater 20.

The medium temperature feed water 18-2 is transferred to the high pressure feed water heater 22, and heated by the high pressure bleed 23 extracted from the high pressure turbine 5 to result in the high temperature feed water 18-3 (boiler feed water 24) which is returned to the super-critically high pressure boiler 1.

Quantitative factors regarding the thermic efficiency gained upon converting the thermal generation to the electricity (referred sometimes merely to as "thermic efficiency" hereinafter) are improved in the following manner.

In the thermal power plant (700 MW class) with the super-critically high pressure, the steam-water mixed fluid 2 has a pressure of 26.5 MPa at a temperature of 375° C. The high pressure exhaust 6 has a pressure of 6.0 MPa at a temperature of 350° C. The low pressure exhaust 12 has a pressure of 0.005 MPa at a temperature of 28° C. The condensed water 14 has a pressure of 1.0 MPa at a temperature of 30° C. The main steam 4 has a super-critically high pressure of 24.6 MPa at a temperature of 538° C. The reheating steam 8 has a pressure of 4.4 MPa at a temperature of 593° C.

As quantitative factors regarding the regenerating cycle, the condensed water 14 has a pressure of 1.0 MPa at a temperature of 30° C. The boiler feed water 24 has a pressure of 29.5 MPa at a temperature of 300° C.

An incremental difference between an enthalpy of the boiler feed water 24 and that of the condensed water 14 is considered to be a total sum of the low pressure bleed 17 in the low pressure feed water heater 16, the medium pressure bleed 21 in the medium pressure feed water heater 20 and the high pressure bleed 23 in the high pressure feed water heater 22, including a pressure rise component in the feed water pump 19.

In the above thermal power plant realized by using the Rankine cycle, in order to elevate the enthalpy level of the condensed water 14 flowed out of the condenser unit 13 to the enthalpy level of the boiler feed water 24, it is necessary to install the low pressure feed water heater 16, the medium pressure feed water heater 20 and the high pressure feed water heater 22 (heater sources) to thermally heat the condensed water 14, the low temperature feed water 18-1, the medium temperature feed water 18-2 and the high temperature feed water 18-3.

Because the low pressure bleed 17, the medium pressure bleed 21 and the high pressure bleed 23 work as the heater sources for the condensed water 14 and the feed water to suppress an ineffective calorific heat from being generated, these pressure bleeds 17, 21 and 23 are very important factors to achieve the high thermic efficiency upon generating the electricity (refer to page 23 of the "Performance and Economy of Steam Turbine" as cited hereinbefore).

The following are individual factors shown for the purpose of comparing the thermal power plant to the large incineration plant.

(thermal power plant)
  construction: thermal power plant used with super-critically high pressure (700 MW class),
  fuel or combustible material used: coal,
  power generation: 700 MW,
  calorific heat quantity on average: 27,300 J/kg,
  incineration or combustible quantity: 270 t/h,
  main steam pressure: 24.5 MPa,
  reheating steam pressure: 4.0 MPa,
  main steam temperature: 566° C.,
  reheating steam temperature: 596° C.,
  condensed-water vacuum: 0.005 MPa,
  thermic efficiency gained upon converting thermal generation to electricity: 42%,
  reheating-and-regenerating cycle: adopted, (large incineration plant)
  construction; 504 t/day,
  fuel or combustible material used: combustible wastes,
  power generation: 27 MW,
  calorific heat quantity on average: 4,800 J/kg,
  incineration or combustible quantity: 62.5 t/h (19.2 t/h in terms of coal),
  main steam pressure: 2.84 MPa,
  reheating steam pressure: - - - ,
  main steam temperature: 300° C.,
  reheating steam temperature; - - - ,
  condensed-water vacuum: 0.02 MPa,
  thermic efficiency gained upon converting thermal generation to electricity: 11%,
  reheating-and-regenerating cycle: not-adopted, The large incineration plant belongs to a large-scaled accommodation facility in which each of three incinerator furnaces has an incineration capacity of 21 t/h to incinerate the combustible wastes at a rate of 504 t/day. The thermal power plant in the large incineration plant does not use the reheating-and-regenerating type Rankine cycle with the main steam pressure (2.84 MPa), the main steam temperature (300° C.) and the thermic efficiency (11%) as raised above. This evidently shows that the large incineration plant is inferior to the thermal power plant in any respective factors.

In the thermal power plant, the thermic efficiency reaches approx. 42%, and the same efficiency reaches as high as approx. 48% at the combined cycle in which the gas turbine is incorporated into the thermal power plant with super-critically high steam pressure.

Even in the thermal power plant efficiently equipped with the combined cycle, it makes the gas turbine and the reheating-and-regenerating type Rankine cycle as a basic combination. This requires the heater source as ever in order to elevate the enthalpy level of the condensed water to that of the boiler feed water 24.

The thermal energy based on the steam produced by the large incineration plant is supplied to the thermal power plant annexed to the large incineration plant, the thermic efficiency is, however, extremely inferior to that of the thermal power plant built for commercial and business purpose. For this reason, it has been highly expected to make an effective use of the thermal energy based on the steam generated by the large incineration plant.

The primary object of the invention is to provide a thermal power plant using a reheating-and-regenerating type Rankine cycle which is capable of making better use of a high temperature fluid produced upon incinerating a huge amount of combustible wastes at a large incineration plant.

The secondary object of the invention is to provide a thermal power plant using a reheating-and-regenerating type Rankine cycle which is capable of supplying the thermal energy to the reheating-and-regenerating type Rankine cycle (generated by the large incineration plant) without reducing the thermic efficiency gained upon converting the thermal energy to electric generation in the thermal power plant.

The tertiary object of the invention is to provide a thermal power plant using a reheating-and-regenerating type Rankine cycle which is capable of controlling a high temperature fluid (generated by the large incineration plant) from accidentally being fed into a water feed line of the thermal power plant.

DISCLOSURE OF THE INVENTION

According to the invention, a superheat conduction pipe is provided to produce a main steam with high pressure and high temperature to transfer the main steam to a high pressure turbine. A reheat conduction pipe is installed in a boiler to reheat a steam produced by a high pressure turbine to provide a reheat steam which is to be supplied to a medium pressure turbine and a low pressure turbine. An evaporation heat conduction pipe is heated by burning the fossil fuel.

An electric generator is driven by each of the turbines to generate an electricity. An exit steam exhausted from the low pressure turbine returns to a condenser unit to form a condensed water. At a feed water path through which the condensed water passes to the evaporation heat conduction pipe of the boiler, a low pressure feed water heater, a medium pressure feed water heater and a high pressure feed water heater are provided, to which a low pressure bleed, a medium pressure bleed and a high pressure bleed are in turn supplied from the respective turbines.

Independent of the feed water path, a feed water bypass is provided to join a condensed water flowed out of the condenser unit and feed waters each flowed from the respective feed water heaters so as to form confluent feed waters. The confluent feed waters are transferred to the evaporation heat conduction pipe by way of a heat exchanger conduction pipe which is provided with a heat exchanger.

In a large incineration plant in which a huge amount of combustible wastes is burned, a large quantity of high temperature fluid (e.g., hot water and steam) is produced on a daily basis. In the thermal power plant using the reheating-and-regenerating type Rankine cycle, the large quantity of high temperature fluid is supplied to the heat exchanger to thermally exchange with the confluent feed waters which are relatively low in temperature, and flow through the heat exchanger conduction pipe. This contributes to making an effective use of the thermal energy produced by burning the combustible wastes. An exhaust fluid which is reduced at its temperature and flowed out of the heat exchanger returns to the large incineration plant by means of a drain pump.

With the use of the heat exchanger, it is possible to increase an enthalpy level of the feed waters each flowing from the respective feed water paths to the evaporation heat conduction pipe of the boiler, thus making it possible to reduce a consumption amount of the fossil fuel so as to save the cost used for the fuel.

By changing an output of the drain pump, it is possible to readily adjust a heat exchange amount with the confluent feed waters so as to sufficiently cope with the calorific heat fluctuation of the high temperature fluid caused from the quantative change of the combustible wastes to be incinerated.

According to other aspect of the invention, a superheat conduction pipe is provided to produce a main steam with high pressure and high temperature to transfer the steam to a high pressure turbine. A reheat conduction pipe is installed in a boiler to reheat a steam produced by a high pressure turbine to provide a reheat steam which is to be supplied to a medium pressure turbine and a low pressure turbine. An evaporation heat conduction pipe is heated by burning the fossil fuel.

An electric generator is driven by each of the turbines to generate an electricity. An exit steam exhausted from the low pressure turbine returns to a condenser unit to form a condensed water. At a feed water path through which the condensed water passes to the evaporation heat conduction pipe of the boiler, a low pressure feed water heater, a medium pressure feed water heater and a high pressure feed water heater are provided, to which a low pressure bleed, a medium pressure bleed and a high pressure bleed are in turn supplied from the respective turbines.

Independent of the feed water path, a feed water bypass is provided to join a condensed water flowed out of the condenser unit and feed waters each flowed from the respective feed water heaters so as to form confluent feed waters. The confluent feed waters are transferred to the evaporation heat conduction pipe by way of a heat exchanger conduction pipe which is provided with a heat exchanger.

Means are provided to adjust a quantity of pressure bleed supplied from each of the turbines to the respective feed water heaters depending on the caloric heat of the high temperature fluid flowing into the heat exchanger.

In a large incineration plant in which a huge amount of combustible wastes is burned, a large quantity of high temperature fluid (e.g., hot water and steam) is produced on a daily basis. In the thermal power plant using the reheating-and-regenerating type Rankine cycle, the large quantity of high temperature fluid is supplied to the heat exchanger to thermally exchange with the confluent feed waters which are relatively low in temperature, and flow through the heat exchanger conduction pipe. This contributes to making an effective use of the thermal energy produced by burning the combustible wastes.

With the use of the heat exchanger, it is possible to increase an enthalpy level of the feed waters each flowing from the respective feed water paths to the evaporation heat conduction pipe of the boiler, thus making it possible to reduce a consumption amount of the fossil fuel so as to save the cost used for the fuel.

Depending on the types and quantities of the combustible wastes, these factors fluctuate the calorific heat of the high temperature fluid supplied to the heat exchanger from the large incineration plant.

In correspondence to the calorific heat of the high temperature fluid supplied to the heat exchanger from the large incineration plant, an amount of the pressure bleed is adjusted from each of the turbines to the respective feed water heaters so as to realize a high thermic efficiency gained upon converting the thermal generation to the electricity in the thermal power plant using the reheating-and-regenerating type Rankine cycle.

According to other aspect of the invention, a superheat conduction pipe is provided to produce a main steam with high pressure and high temperature to transfer the steam to a high pressure turbine. A reheat conduction pipe is installed in a boiler to reheat a steam produced by a high pressure turbine to provide a reheat steam which is to be supplied to a medium pressure turbine and a low pressure turbine. An evaporation heat conduction pipe is heated by burning the fossil fuel.

An electric generator is driven by each of the turbines to generate an electricity. An exit steam exhausted from the low pressure turbine returns to a condenser unit to form a condensed water. At a feed water path through which the condensed water passes to the evaporation heat conduction pipe of the boiler, a low pressure feed water heater, a medium pressure feed water heater and a high pressure feed water heater are provided, to which a low pressure bleed, a medium pressure bleed and a high pressure bleed are in turn supplied from the respective turbines.

Independent of the feed water path, a feed water bypass is provided to join a condensed water flowed out of the condenser unit and feed waters each flowed from the respective feed water heaters so as to form confluent feed waters. The confluent feed waters are transferred to the evaporation heat conduction pipe by way of a heat exchanger conduction pipe which is provided with a heat exchanger.

Means are provided so that a resultant pressure of the confluent feed waters passing through the heat exchanger conduction pipe always exceeds a pressure of the high pressure fluid supplied to the heat exchanger from the large incineration plant.

In a large incineration plant in which a huge amount of combustible wastes is burned, a large quantity of high temperature fluid (e.g., hot water and steam) is produced on a daily basis. In the thermal power plant using the reheating-and-regenerating type Rankine cycle, the large quantity of high temperature fluid is supplied to the heat exchanger to thermally exchange with the confluent feed waters which are relatively low in temperature, and flow through the heat exchanger conduction pipe. This contributes to making an effective use of the thermal energy produced by burning the combustible wastes.

With the use of the heat exchanger, it is possible to increase an enthalpy level of the feed waters each flowing from the respective feed water paths to the evaporation heat conduction pipe of the boiler, thus making it possible to reduce a consumption amount of the fossil fuel so as to save the cost used for the fuel.

In the thermal power plant using the reheating-and-regenerating type Rankine cycle, it is adapted that the resultant pressure of the confluent feed waters passing through the heat exchanger conduction pipe always exceeds the pressure of the high pressure fluid supplied to the heat exchanger from the large incineration plant.

This obviates the risk of the high temperature fluid from invading into the feed waters supplied to the boiler through cracks or holes which would be accidentally formed on the heat exchanger conduction pipe when exposed to vibration, errosion or metallic fatigue, if any.

BRIEF DESCRIPTION OF THE DRAWINGS

Preferred forms of the present invention are illustrated in the accompanying drawings in which.

BEST MODES TO CARRY OUT THE EMBODIMENTS OF THE INVENTION

Figure 1:
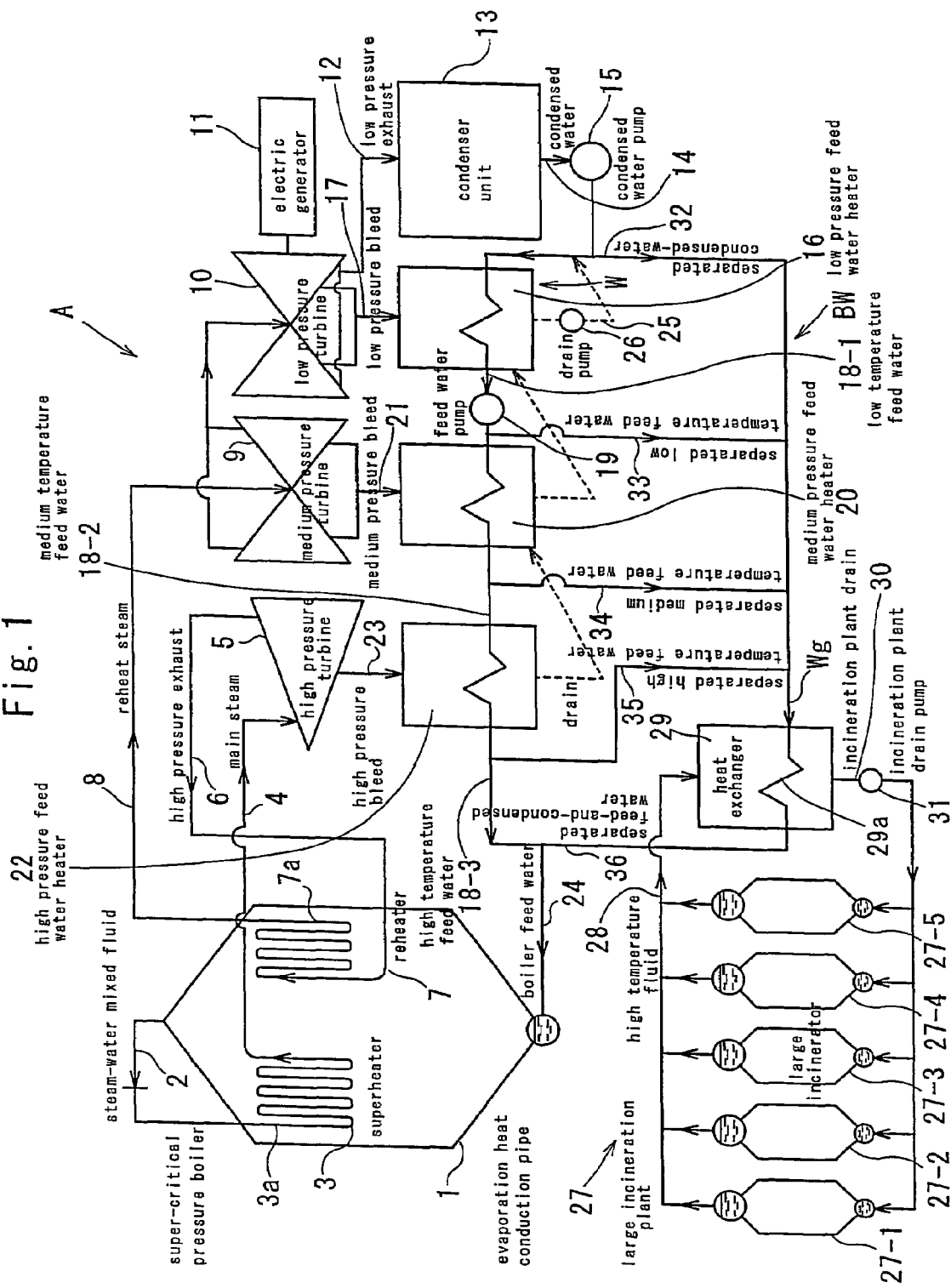
FIG. 1 is an explanatory view of a thermal power plant using a reheating-and-regenerating Rankine cycle to show a basic principle how the plant works.

In the following description of the depicted embodiments, the like reference numerals are used for features of the same type.

Figure 2:
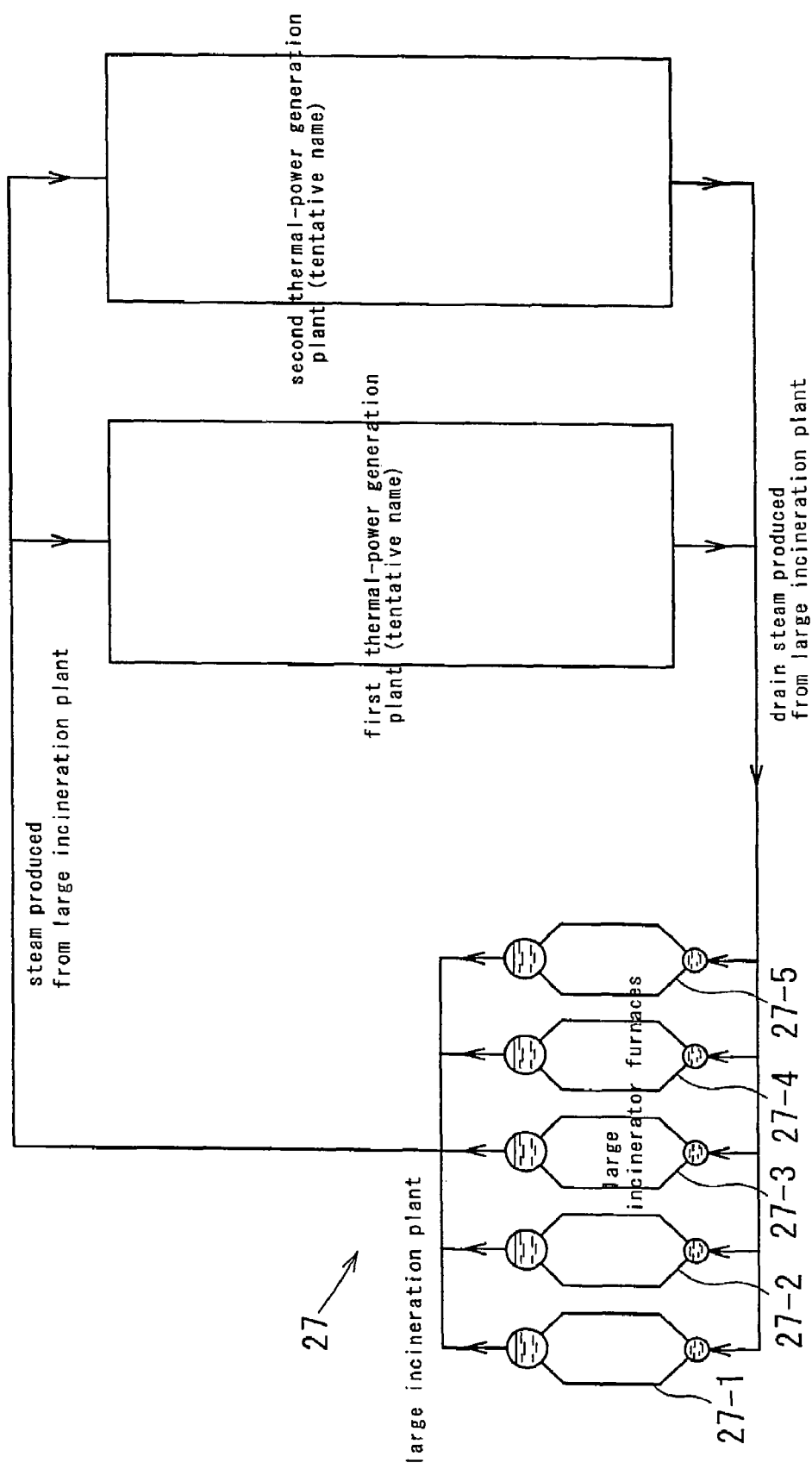
FIG. 2 is an explanatory view of the thermal power plant using a reheating-and-regenerating Rankine cycle.
Figure 3:
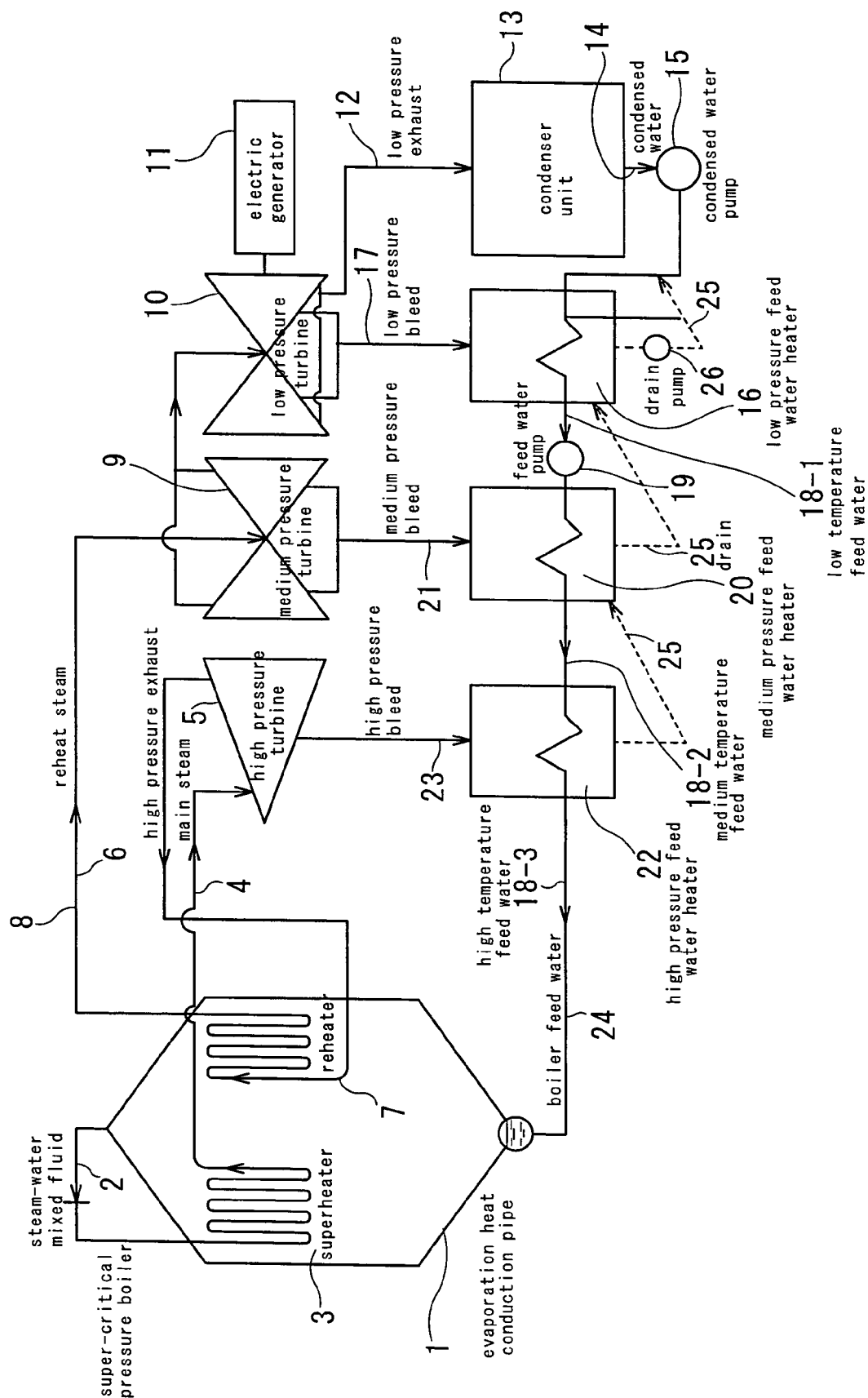
FIG. 3 is an explanatory view showing how a high temperature fluid is supplied to two thermal power plants from a large incineration plant in the thermal power plants using the reheating-and-regenerating Rankine cycle.

Referring to FIGS. 1 and 2 which shows a thermal power plant (A) using a reheating-and-regenerating Rankine cycle according to an embodiment of the invention, as shown in FIG. 1, the thermal power plant (A) has the super-critically high pressure boiler 1, the electric generator 11, the condenser unit 13, a feed water path (W) and a feed water bypass (BW). To the feed water bypass (BW), the thermal energy is supplied from five large incinerator furnaces 27-1, . . . , 27-5 installed on a large incineration plant 27. By way of illustration, the thermal power plant (A) is placed at two sites in the large incineration plant 27 as shown in FIG. 2.

The super-critically high pressure boiler 1 has a superheat conduction pipe 3a at a superheater 3 to produce the main steam 4 with high pressure and high temperature so as to supply it to the high pressure turbine 5. A reheat conduction pipe 7a is provided to reheat the high pressure exhaust 6 (high temperature steam) generated from the high pressure turbine 5 so as to form the reheat steam 8 which is transferred from the reheater 7 to the low pressure turbine 10 and the medium pressure turbine 9. The steam is superheated or reheated when flowing through the superheat conduction pipe 3a and the reheat conduction pipe 7a due to the caloric heat generated by burning a fossil fuel (e.g., coal, petroleum, liquefied natural gas or the like).

The electric generator 11 is driven by the high pressure turbine 5, the medium pressure turbine 9 and the low pressure turbine 10 to generate an electricity. The condenser unit 13 is provided to return a liquid water from the low pressure exhaust 12 (exit exhaust) produced by the low pressure turbine 10.

In order to pass the condensed water 14 flowing through the condenser unit 13, the feed water path (W) provides a high pressure bleed 23, a medium pressure bleed 21 and the low pressure bleed 17 each produced by the respective turbines 5, 9, 10 and fed into the high pressure feed water heater 22, the medium pressure feed water heater 20 and the low pressure feed water heater 16.

The condensed water 14 flowed out of the condenser unit 14 is transferred to the feed water path (W) and the feed water bypass (BW) in the form of a separated condensed-water 32.

Independent of the feed water path (W), the feed water bypass (BW) is provided to supply confluent feed waters (Wg) to the super-critically high pressure boiler 1 through the heat exchanger conduction pipe 29a. The confluent feed waters (Wg) include the separated condensed-water 32 (feed water branch), a separated low-temperature condensed-water 33 (feed water branch), a separated medium-temperature condensed-water 34 (feed water branch) and a separated high-temperature condensed-water 35 (feed water branch).

The separated low-temperature condensed-water 33 is branched out of the low-temperature feed water 18-1, the separated medium-temperature condensed-water 34 branched out of the medium-temperature feed water 18-2, and the separated high-temperature condensed-water 35 branched out of the high-temperature feed water 18-3.

Due to the high temperature fluid 28 (e.g., hot water or steam) produced by the large incinerator furnaces 27-1, . . . , 27-5 and supplied to the heat exchanger 29, the confluent feed waters (Wg) are heated upon passing through the heat exchanger conduction pipe 29a so as to form a separated feed-and-condensed water 36. The separated feed-and-condensed water 36 goes out of the heat exchanger conduction pipe 29a to join the high temperature feed water 18-3 at the feed water path (W), and join the boiler feed water 24 to be heated at the super-critically high pressure boiler 1 in order to form the steam-water mixed fluid 2. Then, the steam-water mixed fluid 2 is transferred to a superheat conduction pipe 3a. It is to be noted that an incineration plant drain 30 returns to the large incinerator furnaces 27-1, . . . , 27-5 by means of an incineration plant pump 31.

At the time when the high temperature fluid 28 passes through the heat exchanger 29 from the large incineration plant 27, the high temperature fluid 28 fluctuates its temperature and flow (i.e., calorific heat) depending on the types and qualities of the combustible wastes to be incinerated.

In order to obviate the fluctuation, an amount and temperature of the confluent feed waters (Wg) are regulated depending on the flow and temperature of the high temperature fluid 28 supplied to the heat exchanger 29 from the large incineration plant 27.

Upon regulating the temperature of the confluent feed waters (Wg), it is sufficient to adjust an amount of the high pressure bleed 23 flowing from the high pressure turbine 5 to the high pressure feed water heater 22, and adjusting an amount of the medium pressure bleed 21 flowing from the medium pressure turbine 9 to the medium pressure feed water heater 20, and further adjusting an amount of the low pressure bleed 17 flowing from the low pressure turbine 10 to the low pressure feed water heater 16.

Upon regulating the flow of the confluent feed waters (Wg), the separated condensed-water 32 is adjusted at its flow by both exits of the condensed-water pump 15 and the feed water pump 19, the separated low temperature feed water 33 is adjusted at its flow by an exit of the low pressure feed water heater 16, the separated medium temperature feed water 34 is adjusted at its flow by an exit of the medium pressure feed water heater 20, and the separated high temperature feed water 35 is adjusted at its flow by an exit of the high pressure feed water heater 22.

In the thermal power plant (A) using the reheating-and-regenerating type Rankine cycle, it is adapted that the resultant pressure of the confluent feed waters (Wg) passing through the heat exchanger conduction pipe 29a always exceeds the pressure of the high pressure fluid 28 supplied to the heat exchanger 29 from the large incineration plant 27.

Following are individual factors used for the large incineration plant 27 and the thermal power plant (A) using the reheating-and-regenerating type Rankine cycle.

(thermal power plant)
   construction: dual-plant installation,
   output power generated (dual type): 1,400 MW,
   output power generated (single type): 700 MW,
   fuel used: coal,
   calorific heat production: 27,300 J/kg,
   amount of fuel used: 270 t/h,
   main steam pressure: 24.5 MPa,
   reheat steam pressure: 3.8 MPa,
   main steam temperature: 566° C.,
   reheat steam temperature: 596° C.,
   thermic efficiency: 42%, (large incineration plant)
   construction: five-plant installation,
   incineration capacity (five): 104 t/h,
   incineration capacity (single): 21 t/h,
   incineration material: combustible wastes,
   calorific heat production: 8,400 J/kg,
   amount of incineration: 104 t/h (32 t/h in terms of coal),
   main steam pressure; 1.0 MPa,
   reheat steam pressure: - - - ,
   main steam temperature: 350° C.,
   reheat steam temperature: - - - ,
   thermic availability: equivalent to 42% (due to the high temperature fluid), In the present invention, the high temperature fluid 28 is supplied to the two thermal power plants (A) from the five large incinerator furnaces 27-1, . . . , 27-5 through the heat exchanger 29.

The two thermal power plants (A) are provided to receive the high temperature fluid 28 flowing from the large incineration plant 27 without suspending the operation even if one of the thermal power plants (A) stops its operation due to the regular check-up, repair or the like. It is to be noted that the thermal power plant may be installed three or more, and the large incineration plant (A) may be provided within the range of 1-4 or more than six.

Upon supplying the high temperature fluid 28 to the heat exchanger 29, it is necessary to produce an analysis and discussion to appropriately maintain a thermal balance between incomings and outgoings so as not to reduce the thermic efficiency of the thermal power plant (A).

In order to avoid the ineffective heat production at the condenser unit 13, it is preferable to heat the feed water flowing through the medium pressure feed water heater 20 and the high pressure feed water heater 22 in which the enthalpy level is elevated. As some of the requirements for an ideal heat supply source, one should be low in steam pressure (e.g., 1.0 MPa) but high in steam temperature (350° C.).

In the thermal power plant (A) using the reheating-and-regenerating type Rankine cycle into which the high temperature fluid 28 flows from the large incineration plant 27, it is important to obviate the risk of the high temperature fluid 28 from invading into the feed waters supplied to the boiler 1 through cracks or holes which would be accidentally formed on the heat exchanger conduction pipe 29a when exposed to vibration, errosion or metallic fatigue due to anual aging.

For this reason, it is adapted that the resultant pressure of the confluent feed waters (Wg) passing through the heat exchanger conduction pipe 29a always exceeds the pressure of the high pressure fluid 28 supplied to the heat exchanger 29 from the large incineration plant 27.

In order for the thermal plant (A) to always receive the high temperature fluid 28 from the large incineration plant 27, it is necessary to prepare an infrastructure from the view point of facility and operation. Even if one of the thermal power plants is suspended at its operation, the heat exchanger 29 should have a heat capacity enough to hold the high temperature fluid 28 flowing from the large incineration plant 27.

For the operation and maintenance, it is necessary to prepare for an emergency cessation of the thermal power plants (one or all) due to earthquake or lighting. The same holds true when the incinerator furnaces 27-1, . . . , 27-5 (one or several) of the large incineration plant 27 stop its operation.

INDUSTRIAL APPLICABILITY

In the large incineration plant, a huge amount of the high temperature fluid (e.g., hot water and steam) is produced on the daily basis. The fluid is supplied to the condensed water and feed water (lower energy level) to heat them in the thermal power plant, thus making it possible to highly utilize the heat energy latent in the combustible wastes.

The thermic efficiency is approx. 10% on average recently gained as a heat-to-electricity coversion rate upon converting the thermal generation to electricity at the thermal power plant operated in the large incineration plant. On the other hand, the thermic efficiency is approx. 42% in the super-critically high pressure type thermal power plant of recent years, and the same thermic efficiency is approx. 48% in the combined cycle in which the gas turbine is incorporated into the super-critically high pressure type thermal power plant.

By supplying the high temperature fluid in the large incineration plant to the thermal power plant, it is possible to make an effective use of the thermal energy four strong times as great as that of the conventional ones.

The supply of the high temperature fluid to the thermal power plant enables the suppliers to a certain amount of energy revenue from electric power companies. This makes advantageous for those communities which owe an expenditure to the large incineration plants, thus paving a new way for thermal-power related enterprises.

The purchase of the thermal energy produced from the combustible wastes makes the electric power companies less costly than they buy the fossil fuel on the market value. This outgrows the financial burden to which the electric power companies owe as regards facility and operation.

For the communities to embark on the thermal-power related enterprises, it is financially advantageous to collectively locate the large incineration plants so as to multiply the accommodation capacity for the combustible wastes, while at the same time, making it ready to supply the high temperature fluid to the thermal power plants. Selling the thermal energy enables the communities to make up for a part of the maintenance cost needed to incinerate the combustible wastes. This obviates the necessity of building the thermal power plant in the large incineration plant, thus making it advantageous regarding building, operation, maintenance and repair costs.

The thermal power plant built in the large incineration plant has problems in operation as follows:

(1) The amount of thermal production is relatively small which is produced upon incinerating the combustible wastes.
(2) The amount of thermal production fluctuates depending on the types and qualities of the combustible wastes.
(3) It is necessary to incinerate the combustible wastes in such a way as to suppress the dioxin emitted in the large incineration plant.

According to the invention, however, the high temperature fluid is produced by the large incineration plant, and supplied to the thermal power plant only to thermally heat the feed water and the boiler water. This reduces the burden to which the large incineration plant side owes as respects management and operation.

With the elimination of installing the thermal power plant in the large incineration plant, it comes necessary to purchase the electric power which the large incineration plant needs. The purchase disbursement, however, can be sufficiently made up for the financial revenue brought by selling the thermal heat production. An amount of the electric power consumed in the large incineration plant will be thought to decrease due to the elimination of building the thermal power plant in the large incineration plant.

The invention claimed is:

1. A thermal power plant (A) using a reheating-and-regenerating type Rankine cycle comprising:

a superheat conduction pipe (3a) provided to produce a main steam (4) with high pressure and high temperature to transfer said main steam (4) to a high pressure turbine (5);

a reheat conduction pipe (7a) is installed in a boiler (1) to reheat a steam produced by said high pressure turbine (5) to provide a reheat steam (8) which is to be supplied to a medium pressure turbine (9) and a low pressure turbine (10);

an evaporation heat conduction pipe provided to be heated by burning a fossil fuel;

an electric generator (11) driven by each of the turbines (5, 9, 10) to generate an electricity;

a condenser unit (13) provided to form a condensed water from an exit steam which said low pressure turbine (10) exhausts;

a feed water path (W) through which the condensed water passes to said evaporation heat conduction pipe of said boiler (1);

said feed water path (W) providing a low pressure feed water heater (16), a medium pressure feed water heater (20) and a high pressure feed water heater (22) to which a low pressure bleed (17), a medium pressure bleed (21) and a high pressure bleed (23) are in turn supplied from the respective turbines (10, 9, 5);

a feed water bypass (BW) provided independent of said feed water path (w) to join a condensed water (14) flowed out of the condenser unit (13) and feed waters (18-1, 18-2, 18-3) each flowed out of the respective feed water heaters (16, 20, 22) so as to form confluent feed waters (Wg), said confluent feed waters (Wg) being transferred to said evaporation heat conduction pipe through a heat exchanger conduction pipe (29a) which is provided with a heat exchanger (29);

whereby a huge amount of combustible wastes incinerated in a large incineration plant (27) produces a high temperature fluid (28) which passes through said heat exchanger (29) to form an incineration plant drain (30) which is returned to said large incineration plant (27) by means of an incineration drain pump (31).

2. A thermal power plant (A) using a reheating-and-regenerating type Rankine cycle comprising:

a superheat conduction pipe (3a) provided to produce a main steam (4) with high pressure and high temperature to transfer said main steam (4) to a high pressure turbine (5);

a reheat conduction pipe (7a) is installed in a boiler (1) to reheat a steam produced by said high pressure turbine (5) to provide a reheat steam (8) which is to be supplied to a medium pressure turbine (9) and a low pressure turbine (10);

an evaporation heat conduction pipe provided to be heated by burning a fossil fuel;

an electric generator (11) driven by each of the turbines (5, 9, 10) to generate an electricity;

a condenser unit (13) provided to form a condensed water from an exit steam which said low pressure turbine (10) exhausts;

a feed water path (w) through which the condensed water passes to said evaporation heat conduction pipe of said boiler (1);

said feed water path (W) providing a low pressure feed water heater (16), a medium pressure feed water heater (20) and a high pressure feed water heater (22) to which a low pressure bleed (17), a medium pressure bleed (21) and a high pressure bleed (23) are in turn supplied from the respective turbines (10, 9, 5);

a feed water bypass (BW) provided independent of said feed water path (W) to join a condensed water (14) flowed out of the condenser unit (13) and feed waters (18-1, 18-2, 18-3) each flowed out of the respective feed water heaters (16, 20, 22) so as to form confluent feed waters (Wg), said confluent feed waters (Wg) being transferred to said evaporation heat conduction pipe through a heat exchanger conduction pipe (29a) which is provided with a heat exchanger (29);

a huge amount of combustible wastes incinerated in a large incineration plant (27) producing a high temperature fluid (28) which passes through said heat exchanger (29) to form an incineration plant drain (30) which is returned to said large incineration plant (27) by means of an incineration plant drain pump (31); and means provided to adjust a quantity of pressure bleed (23, 21, 17) supplied from each of the turbines (5, 9, 10) to the respective feed water heaters (22, 20, 16) depending on the caloric heat of the high temperature fluid (28) flowing into the heat exchanger (29).

3. The thermal power plant (A) using a reheating-and-regenerating type Rankine cycle according to claim 1 or 2, wherein upon regulating the temperature of said confluent feed waters (Wg), an amount of said high pressure bleed (23) flowing from said high pressure turbine (5) to said high pressure feed water heater (22) is adjustable, and an amount of said medium pressure bleed (21) flowing from said medium pressure turbine (9) to said medium pressure feed water heater (20) is also adjustable, and further an amount of said low pressure bleed (17) flowing from said low pressure turbine (10) to said low pressure feed water heater (16) is adjustable, and on the other hand, upon regulating the flow of said confluent feed waters (Wg), a separated condensed-water (32) from said condenser unit (13) is adjustable at its flow by a condensed-water pump (15) and a feed water pump (19), a separated low temperature feed water (33) from said low pressure feed water heater (16) is adjustable at its flow by an exit of said low pressure feed water heater (16), a separated medium temperature feed water (34) from said medium pressure feed water heater (20) is adjustable at its flow by an exit of said medium pressure feed water heater (20), and a separated high temperature feed water (35) from said high pressure feed water heater (22) is adjustable at its flow by an exit of said high pressure feed water heater (22).

4. A thermal power plant (A) using a reheating-and-regenerating type Rankine cycle comprising:

a superheat conduction pipe (3a) provided to produce a main steam (4) with high pressure and high temperature to transfer said main steam (4) to a high pressure turbine (5);

a reheat conduction pipe (7a) is installed in a boiler (1) to reheat a steam produced by said high pressure turbine (5) to provide a reheat steam (8) which is to be supplied to a medium pressure turbine (9) and a low pressure turbine (10);

an evaporation heat conduction pipe provided to be heated by burning a fossil fuel;

an electric generator (11) driven by each of the turbines (5, 9, 10) to generate an electricity;

a condenser unit (13) provided to form a condensed water from an exit steam which said low pressure turbine (10) exhausts;

a feed water path (W) through which the condensed water passes to said evaporation heat conduction pipe of said boiler (1);

said feed water path (W) providing a low pressure feed water heater (16), a medium pressure feed water heater (20) and a high pressure feed water heater (22) to which a low pressure bleed (17), a medium pressure bleed (21) and a high pressure bleed (23) are in turn supplied from the respective turbines (10, 9, 5);

a feed water bypass (BW) provided independent of said feed water path (W) to join a condensed water (14) flowed out of the condenser unit (13) and feed waters (18-1, 18-2, 18-3) each flowed out of the respective feed water heaters (16, 20, 22) so as to form confluent feed waters (Wg), said confluent feed waters (Wg) being transferred to said evaporation heat conduction pipe through a heat exchanger conduction pipe (29a) which is provided with a heat exchanger (29);

a huge amount of combustible wastes incinerated in a large incineration plant (27) producing a high temperature fluid (28) which passes through said heat exchanger (29) to form an incineration plant drain (30) which is returned to said large incineration plant (27) by means of an incineration plant drain pump (31); and means provided so that a resultant pressure of said confluent feed waters (14, 18-1, 18-2, 18-3) passing through the heat exchanger conduction pipe (29a) always exceeds a pressure of the high pressure fluid (28) supplied to the heat exchanger (29) from the large incineration plant (27).

5. The thermal power plant (A) using a reheating-and-regenerating type Rankine cycle according to claim 4, wherein upon regulating the temperature of said confluent feed waters (Wg), an amount of said high pressure bleed (23) flowing from said high pressure turbine (5) to said high pressure feed water heater (22) is adjustable, and an amount of said medium pressure bleed (21) flowing from said medium pressure turbine (9) to said medium pressure feed water heater (20) is also adjustable, and further an amount of said low pressure bleed (17) flowing from said low pressure turbine (10) to said low pressure feed water heater (16) is adjustable, and on the other hand, upon regulating the flow of said confluent feed waters (Wg), a separated condensed-water (32) from said condenser unit (13) is adjustable at its flow by a condensed-water pump (15) and a feed water pump (19), a separated low temperature feed water (33) from said low pressure feed water heater (16) is adjustable at its flow by an exit of said low pressure feed water heater (16), a separated medium temperature feed water (34) from said medium pressure feed water heater (20) is adjustable at its flow by an exit of said medium pressure feed water heater (20), and a separated high temperature feed water (35) from said high pressure feed water heater (22) is adjustable at its flow by an exit of said high pressure feed water heater (22).

* * * * *